(12) United States Patent
She

(10) Patent No.: US 10,880,418 B2
(45) Date of Patent: Dec. 29, 2020

(54) HOUSING ASSEMBLY FOR TERMINAL AND TERMINAL WITH HOUSING ASSEMBLY

(71) Applicant: GUANGDONG OPPO MOBILE TELECOMMUNICATIONS CORP., LTD., Guangdong (CN)

(72) Inventor: Binbin She, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 225 days.

(21) Appl. No.: 16/053,377

(22) Filed: Aug. 2, 2018

(65) Prior Publication Data

US 2019/0104209 A1  Apr. 4, 2019

(30) Foreign Application Priority Data

Sep. 30, 2017 (CN) .......................... 2017 1 0915358
Sep. 30, 2017 (CN) .......................... 2017 1 0919575

(Continued)

(51) Int. Cl.
*H04R 1/02* (2006.01)
*H04R 1/08* (2006.01)
(Continued)

(52) U.S. Cl.
CPC ........ *H04M 1/0249* (2013.01); *H04B 1/3833* (2013.01); *H04M 1/03* (2013.01);
(Continued)

(58) Field of Classification Search
CPC ............ H04R 2205/021; H04R 25/608; H04R 25/65; H04R 1/023; H04R 1/086; G06F 1/16; H04M 1/0206
See application file for complete search history.

(56) References Cited

U.S. PATENT DOCUMENTS 6,553,119 B1 *   4/2003  Mori ..................... H04M 1/03
                                                  379/433.11
2004/0264688 A1 * 12/2004 Hampton ............... H04M 1/03
                                                  379/433.02
(Continued)

FOREIGN PATENT DOCUMENTS

CN      102611954 A      7/2012
CN      204481865 U      7/2015
(Continued)

OTHER PUBLICATIONS

European search report for Application No. EP18188210.3, dated Mar. 4, 2019 (8 pages).

(Continued)

*Primary Examiner* — Walter F Briney, III
(74) *Attorney, Agent, or Firm* — Ladas & Parry LLP

(57) ABSTRACT

The present disclosure provides a housing assembly for a terminal, and a terminal with the housing assembly. The housing assembly may include a middle frame, an electroacoustic assembly and decorative member. The electroacoustic assembly is arranged on the middle frame and defines a sound transmission hole. The decorative member defines an inner space. The at least portion of the decorative member faces the sound transmission hole. The decorative member is fixed to the electroacoustic assembly. The sound transmission hole directly communicates with the inner space of the decorative member.

20 Claims, 14 Drawing Sheets

(30) Foreign Application Priority Data

| Sep. 30, 2017 | (CN) | 2017 1 0922500 |
|---|---|---|
| Sep. 30, 2017 | (CN) | 2017 1 0922503 |
| Sep. 30, 2017 | (CN) | 2017 1 0940312 |

(51) Int. Cl.

| H04M 1/02 | (2006.01) |
|---|---|
| H04M 1/03 | (2006.01) |
| H04B 1/3827 | (2015.01) |
| H04M 1/18 | (2006.01) |
| H04B 1/38 | (2015.01) |

(52) U.S. Cl.
CPC ....... *H04M 1/18* (2013.01); *H04B 2001/3894* (2013.01); *H04R 1/021* (2013.01); *H04R 1/023* (2013.01); *H04R 1/086* (2013.01); *H04R 2499/11* (2013.01)

(56) References Cited

U.S. PATENT DOCUMENTS

| 2009/0034777 | A1 | 2/2009 | Nho et al. | |
|---|---|---|---|---|
| 2011/0255726 | A1* | 10/2011 | Yu | H04R 1/02 381/332 |
| 2013/0170109 | A1* | 7/2013 | Cohen | H04M 1/03 361/679.01 |
| 2017/0041692 | A1* | 2/2017 | Watson | H04R 1/023 |

FOREIGN PATENT DOCUMENTS

| CN | 204968093 U | 1/2016 |
|---|---|---|
| CN | 205082089 U | 3/2016 |
| CN | 106453756 A | 2/2017 |
| CN | 106506752 A | 3/2017 |
| CN | 106507265 A | 3/2017 |
| CN | 106792405 A | 5/2017 |
| CN | 206364847 U | 7/2017 |
| CN | 107508953 A | 12/2017 |
| CN | 107666803 A | 2/2018 |
| CN | 107690013 A | 2/2018 |
| CN | 107707709 A | 2/2018 |
| CN | 107708353 A | 2/2018 |
| CN | 207184611 U | 4/2018 |
| DE | 10328380 A1 | 2/2004 |
| EP | 1703764 A2 | 9/2008 |
| WO | WO2014135035 A1 | 9/2014 |

OTHER PUBLICATIONS

First Office Action from China patent office in a counterpart China application No. 201710919575.7 (publication No. CN107508953A), dated Mar. 27, 2019 (15 pages).
International Search Report issued in corresponding international application No. PCT/CN2018101350,dated Nov. 13, 2018 (10 pages).
Indian First Examination Report, Indian Application No. 201814034099, dated Aug. 14, 2020 (7 pages).
Australian First Examination Report, Australian Application No. 2018339943, dated Aug. 27, 2020, (4 pages).

* cited by examiner

HOUSING ASSEMBLY FOR TERMINAL AND TERMINAL WITH HOUSING ASSEMBLY

CROSS-REFERENCE TO RELATED APPLICATIONS

This application claims priorities to Chinese Patent Application Nos. 201710919575.7, 201710922503.8, 201710922500.4, 201710915358.0 and 201710940312.4, all filed on Sep. 30, 2017, the contents of which are herein incorporated by reference in their entireties.

TECHNICAL FIELD

The present disclosure relates to the field of terminal technologies, and in particular, to a housing assembly for a terminal and a terminal with a housing assembly.

BACKGROUND

In the related art, a large amount of auxiliary materials are used in an assembling process of a decorative member for an electroacoustic assembly in order to ensure airtightness of a sound transmission passage. However, assembling of the auxiliary materials is mostly based on manual operation, so a labor cost is high, and an assembling effect is difficult to be controlled.

BRIEF DESCRIPTION OF THE DRAWINGS

In order to make the technical solution described in the embodiments of the present disclosure more clearly, the drawings used for the description of the embodiments will be briefly described. Apparently, the drawings described below are only for illustration but not for limitation. It should be understood that, one skilled in the art may acquire other drawings based on these drawings, without making any inventive work.

DETAILED DESCRIPTION

Figure 1:
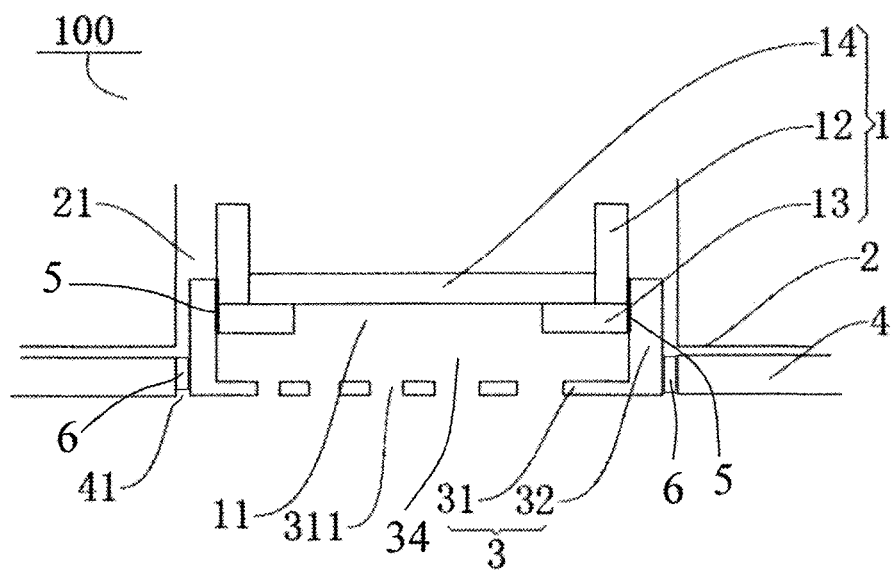
FIG. 1 is a structural schematic view of an electroacoustic assembly according to an embodiment of the present disclosure, wherein the electroacoustic assembly is a receiver assembly and a decorative member is fixed thereto via dispensed adhesive.

Embodiments of the present disclosure will be described in detail below, examples of which are shown in the accompanying figures, in which the same or similar reference numerals have been used throughout to denote the same or similar elements or elements serving the same or similar functions. The embodiments described below with reference to the accompanying figures are exemplary only, meaning they are intended to be illustrative of rather than limiting the disclosure.

In the specification of the present disclosure, it is understood that terms such as "central", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumference" and so on refer to the orientations and locational relations illustrated in the figures, and are used for describing the present disclosure and for describing in a simple manner, and which are not intended to indicate or imply that the devices or the elements are disposed to locate at the specific directions or are structured and performed in the specific directions, which could not be understood as limiting the present disclosure. In addition, the feature defined with "first" and "second" may include one or more of such features implicitly or explicitly. In the description of the present disclosure, the term "a plurality of" means two or more than two, unless specified otherwise.

In the present disclosure, it is noted that, unless explicitly specified or limited otherwise, terms "mounted", "connected", "coupled" are used in a broad sense, and may include, for example, fastened connections, detachable connections, or integral connections; may also be mechanical or electrical connections; may also be direct connections or indirect connections via intervening structures; may also be inner communications of two elements, as may be understood by those skilled in the art depending on specific contexts.

Referring to FIGS. 1-6, a housing assembly 100 for a terminal 1000 and the terminal 1000 with the housing assembly 100 according to embodiments of the present disclosure are described.

As shown in FIGS. 1-5, the housing assembly 100 for the terminal 1000 according to embodiments of the present disclosure may include a middle frame 2, an electroacoustic assembly 1, and a decorative member 3. The decorative member 3 may define an inner space 34 (only labeled in FIG. 1). The middle frame 2 may be a frame located between a display unit of the terminal 1000 and a back cover of the terminal 1000, and may be configured to carry various internal components such as a battery, a main board, a camera, the electroacoustic assembly 1, etc.

Specifically, as shown in FIGS. 1-5, the electroacoustic assembly 1 may be arranged on the middle frame 2, and the electroacoustic assembly 1 may define a sound transmission hole 11. The sound transmission hole 11 has a function of transmitting sound, and may transmit outside sound into the electroacoustic assembly 1 or transmit sound produced by the electroacoustic assembly 1 out. The decorative member 3 may be opposite to the sound transmission hole 11, and the decorative member 3 may be fixed to the electroacoustic assembly 1 via dispensed adhesive 5. The sound transmission hole 11 may directly communicate with the inner space 34 of the decorative member 3. Therefore, use and assembling of auxiliary materials may be reduced, airtight reliability may be enhanced, material cost and labor cost may be reduced, an assembling process may be simplified, an assembling efficiency may be improved, and the need for disassembling operations due to improper attachment of the auxiliary materials may be avoided.

The dispensed adhesive 5 may be achieved by a form-in-place process (i.e., an adhesive dispensing process), and the adhesive may be glue, epoxy resin, etc. Further, the adhesive may be dispensed automatically (e.g., by a dispenser) or manually.

In the housing assembly 100 for the terminal 1000 according to embodiments of the present disclosure, the decorative member 3 may be coupled to the electroacoustic assembly 1 by means of the dispensed adhesive 5. Accordingly, the use and assembling of auxiliary materials may be reduced, the material cost and labor cost may be reduced, the assembling process may be simplified, the assembling efficiency may be improved, and the need for disassembling operations due to improper attachment of the auxiliary materials may be avoided. Further, airtight reliability may be enhanced.

In some embodiments of the present disclosure, as shown in FIGS. 1-5, the middle frame 2 may define a mounting hole 21, and at least part of the electroacoustic assembly 1 may be arranged in the mounting hole 21. Therefore, a structure of the middle frame 2 and the electroacoustic assembly 1 may be more compact and reasonable, and an overall thickness of the middle frame 2 and the electroacoustic assembly 1 may be reduced to meet light and thin requirements of the terminal 1000.

In order to facilitate installation of the electroacoustic assembly 1, the mounting hole 21 may be a through hole penetrating the middle frame 2 in the thickness direction. Alternatively, the mounting hole 21 may be a groove defined in the middle frame 2, wherein an opening of the groove may locate at a side of the electroacoustic component 1 away from the decorative member 3, a through hole may be defined at a bottom of the groove for achieving the function of sound transmission, and part of the decorative component 3 may also protrude into the through hole.

Further, in order to improve reliability of fixation between the electroacoustic assembly 1 and the mounting hole 21, interference fit between the mounting hole 21 and the electroacoustic assembly 1 may be provided. Of course, the present disclosure is not limited thereto. For example, a double-sided adhesive tape may be provided between an inner peripheral wall of the mounting hole 21 and an outer peripheral wall of the electroacoustic assembly 1 to achieve relative fixation between the decoration member 3 and the mounting hole 21. As another example, the inner peripheral wall of the mounting hole 21 and the outer peripheral wall of the electroacoustic assembly 1 may also be fixed by the dispensed adhesive.

Further, as shown in FIGS. 1-5, at least part of the decorative member 3 locates within the mounting hole 21. As a result, a structure of the decorative member 3, the electroacoustic assembly 1 and the middle frame 2 may be more compact and reasonable, the connection between the decorative member 3 and the electroacoustic assembly 1 may be also facilitated and the reliability of the connection therebetween may be enhanced.

In some embodiments of the present disclosure, as shown in FIGS. 1-5, the decorative member 3 may include a metal mesh 31 and a flange 32, and the flange 32 may be provide at an edge of the metal mesh 31. The metal mesh 31 and the flange 32 may be integrally formed, or may be fixed by the dispensed adhesive. The metal mesh 31 may define a plurality of sound holes 311 for passing sound. The flange 32 may be coupled to the electroacoustic assembly 1 via the dispensed adhesive 5. Therefore, the connection between the decorative member 3 and the electroacoustic assembly 1 may be facilitated.

In addition, the decorative member 3 may include magnetic conductive material, so that iron filings and dust may be prevented from adhering to the decorative member 3 to block the sound holes 311 of the decorative member 3. Accordingly, an aesthetic appearance of the decorative member 3 may be improved, and sound transmission effect of the decorative member 3 may be improved. The decorative member 3 may be made of stainless steel, and the stainless steel may use the type of SUS430.

In some embodiments of the present disclosure, at least one of a connection surface of the decorative member 3 for coupling to the electroacoustic assembly 1, and a connection surface of the electroacoustic assembly 1 for coupling to the decorative member 3 may be a curved surface. In other words, only the connection surface of the decorative member 3 for coupling to the electroacoustic assembly 1 may be the curved surface, only the connection surface of the electroacoustic assembly 1 for coupling to the decorative member 3 may be the curved surface, or both the connection surface of the decorative member 3 for coupling to the electroacoustic assembly 1 and the connection surface of the electroacoustic assembly 1 for coupling to the decorative member 3 may be curved surfaces. The curved surface may be an arc surface or a wavy surface. Alternatively, a groove structure may be arranged on a planar surface to form a curved surface; i.e., at least one of the connection surface of the decorative member 3 for coupling to the electroacoustic assembly 1 and the connection surface of the electroacoustic assembly 1 for coupling to the decorative member 3 may be provided with the groove structure. As a result, the amount of adhesive may be increased, and the reliability of the connection between the electroacoustic assembly 1 and the decorative member 3 may be improved.

Figure 2:
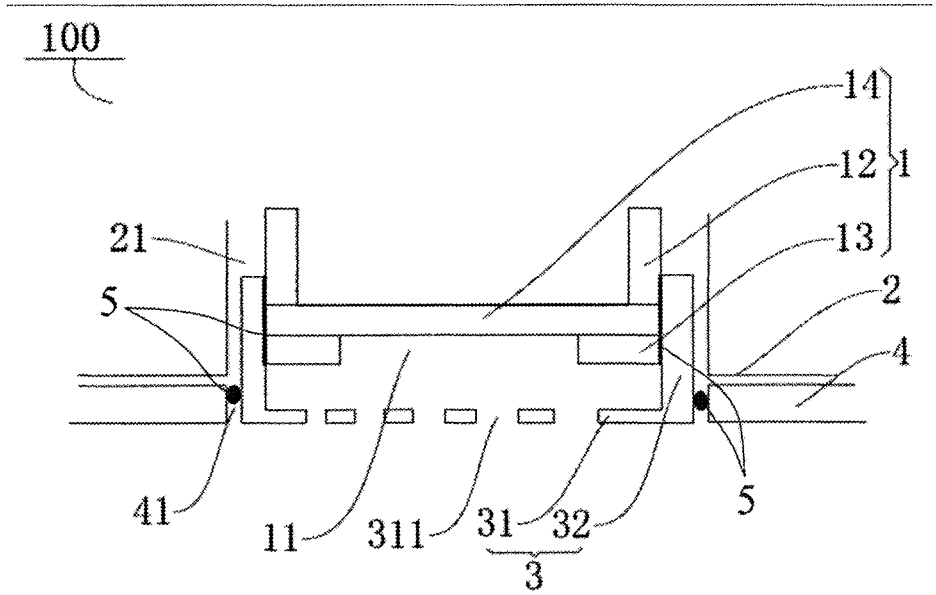
FIG. 2 is a structural schematic view of an electroacoustic assembly according to an embodiment of the present disclosure, wherein the electroacoustic assembly is a receiver assembly and a decorative member is fixed thereto via dispensed adhesive.
Figure 3:
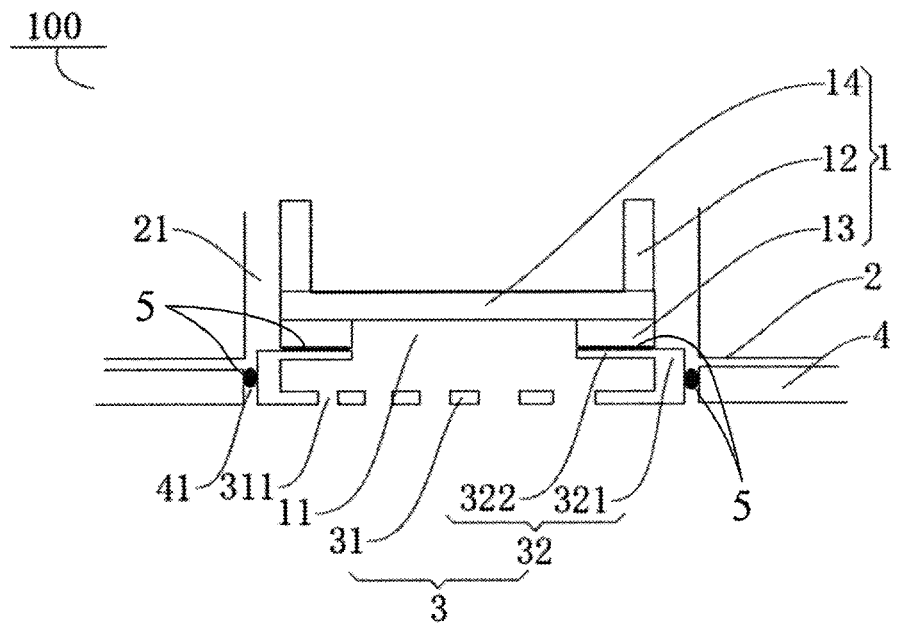
FIG. 3 is a structural schematic view of an electroacoustic assembly according to an embodiment of the present disclosure, wherein the electroacoustic assembly is a receiver assembly and a decorative member is fixed thereto via dispensed adhesive.

In some embodiments of the present disclosure, as shown in FIGS. 1-3, the electroacoustic assembly 1 may be a receiver assembly which may include a bracket 12, a closure plate 13 and a vibrating diaphragm 14. The closure plate 13 may be arranged on the bracket 12, the sound transmission hole 11 may be defined in the closure plate 13, the decorative member 3 may be located at a side of the closure plate 13 that is away from the bracket 12, and the decorative member 3 may be coupled to at least one of the bracket 12 and the closure plate 13 by means of the dispensed adhesive 5. Therefore, the decorative member 3 may be fixed to the receiver assembly, the use and assembling of auxiliary materials may be reduced, the airtight reliability may be enhanced, the material cost and labor cost may be reduced, the assembling process may be simplified, the assembling efficiency may be improved, and the need for disassembling operations due to improper attachment of the auxiliary materials may be avoided.

As shown in FIG. 1, the vibrating diaphragm 14 may be located at a side of the closure plate 13 adjacent to the bracket 12, and the vibrating diaphragm 14 may be located at an inner side of the bracket 12. As shown in FIGS. 2-3, the vibrating diaphragm 14 may be located between the bracket 12 and the closure plate 13. As shown in FIGS. 1-2, the flange 32 of the decorative member 3 may be perpendicular to the metal mesh 31, the closure plate 13 and the bracket 12 may be located at an inner side of the flange 32, and an inner peripheral wall of the flange 32 of the decorative member 3 may be coupled to an outer peripheral wall of the closure plate 13 via the dispensed adhesive 5 so as to achieve the connection between the decorative member 3 and the receiver assembly. Of course, the inner peripheral wall of the flange 32 of the decorative member 3 may be coupled to an outer peripheral wall of the bracket 12 via the dispensed adhesive 5 so as to achieve the connection between the decorative member 3 and the receiver assembly. Of course, the inner peripheral wall of the flange 32 of the decorative member 3 and the outer peripheral wall of the closure plate 13 as well as the inner peripheral wall of the flange 32 and the outer peripheral wall of the bracket 12 may be coupled via the dispensed adhesive 5 so as to achieve the connection between the decorative member 3 and the receiver assembly. Of course, the flange 32 may further be coupled to the inner peripheral wall of the sound transmission hole 11 via the dispensed adhesive.

In addition, as shown in FIG. 3, the flange 32 of the decorative member 3 may include a vertical segment 321 and a horizontal segment 322. One end of the vertical segment 321 may be coupled to the metal mesh 31, the other end of the vertical segment 321 may be coupled to one end of the horizontal segment 322, and the other end of the horizontal segment 322 may extend towards a central axis of the decorative member 3. The horizontal segment 322 may be perpendicular to the vertical segment 321, and may be parallel to the metal mesh 31. The horizontal segment 322 may be coupled to a side of the closure plate 13 facing the decorative member 3 via the dispensed adhesive 5.

Further, the closure plate 13 may include magnetic conductive material, so that iron filings and dust may be prevented from adhering to the closure plate 13. Accordingly, the reliability of the closure plate 13 may be improved, and the reliability of the receiver assembly may be improved. The closure plate 13 may be made of stainless steel, and the stainless steel may use the type of SUS430. The bracket 12 may be made of plastic material.

Figure 4:
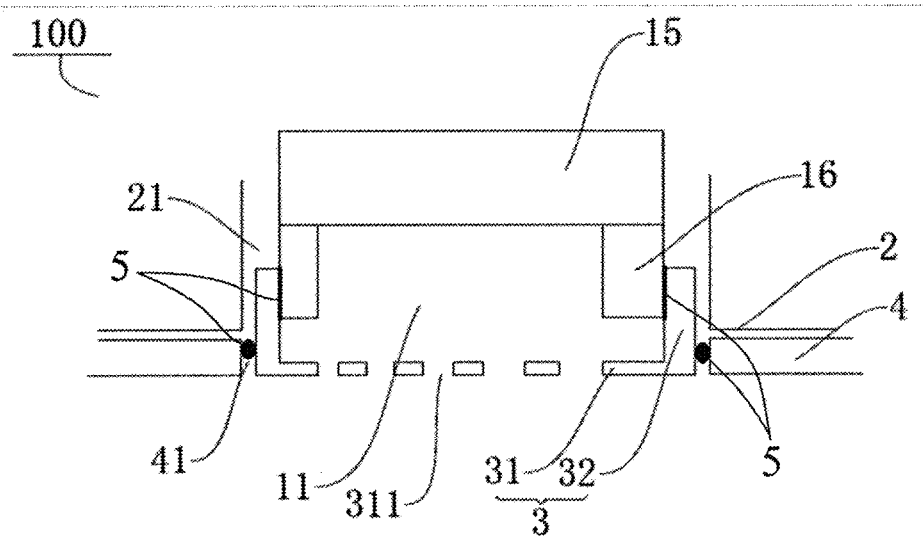
FIG. 4 is a structural schematic view of an electroacoustic assembly according to an embodiment of the present disclosure, wherein the electroacoustic assembly is a speaker assembly and a decorative member is fixed thereto via dispensed adhesive.

In some embodiments of the present disclosure, as shown in FIG. 4, the electroacoustic assembly 1 may be a speaker assembly including a speaker 15 and a sound transmission part 16. The sound transmission part 16 may be arranged on the speaker 15, and the sound transmission hole 11 may be defined in the sound transmission part 16. The decorative member 3 may be located at a side of the sound transmission part 16 away from the speaker 15, and the decorative member 3 may be coupled to the sound transmission part 16 by means of the dispensed adhesive 5. Therefore, the decorative member 3 may be fixed to the speaker assembly, the use and assembling of auxiliary materials may be reduced, the airtight reliability may be enhanced, the material cost and labor cost may be reduced, the assembling process may be simplified, the assembling efficiency may be improved, and the need for disassembling operations due to improper attachment of the auxiliary materials may be avoided.

As shown in FIG. 4, the flange 32 of the decorative member 3 may be perpendicular to the metal mesh 31. The sound transmission part 16 may be located at an inner side of the flange 32, and an outer peripheral wall of the sound transmission part 16 may be coupled to an inner peripheral wall of the flange 32 of the decorative member 3 via the dispensed adhesive 5. Of course, the flange 32 may also be located at the inner side of the sound transmission hole 11, and the outer peripheral wall of the flange 32 may be coupled to the inner peripheral wall of the sound transmission hole 11 via the dispensed adhesive.

Figure 5:
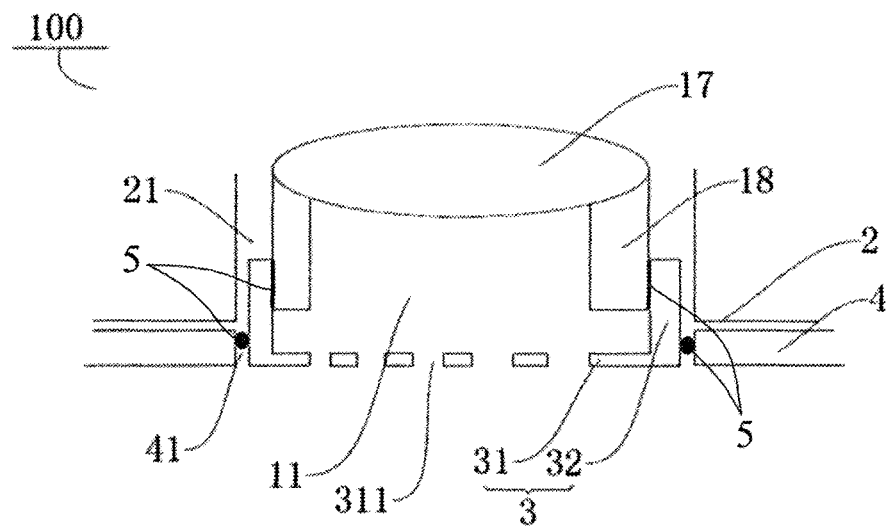
FIG. 5 is a structural schematic view of an electroacoustic assembly according to an embodiment of the present disclosure, wherein the electroacoustic assembly is a microphone assembly and a decorative member is fixed thereto via dispensed adhesive.

In some embodiments of the present disclosure, as shown in FIG. 5, the electroacoustic assembly 1 may be a microphone assembly including a microphone 17 and a shielding case 18. The shielding case 18 may be arranged on the microphone 17, and the sound transmission hole 11 may be defined in the shielding case 18. The decorative member 3 may be located at a side of the shielding case 18 away from the microphone 17, and the decorative member 3 may be coupled to the shielding case 18 by means of the dispensed adhesive 5. Therefore, the decorative member 3 may be fixed to the microphone assembly, the use and assembling of auxiliary materials may be reduced, the airtight reliability may be enhanced, the material cost and labor cost may be reduced, the assembling process may be simplified, the assembling efficiency may be improved, and the need for disassembling operations due to improper attachment of the auxiliary materials may be avoided.

As shown in FIG. 5, the flange 32 of the decorative member 3 may be perpendicular to the metal mesh 31. The shielding case 18 may be located at the inner side of the flange 32, and an outer peripheral wall of the shielding case 18 may be coupled to the inner peripheral wall of the flange 32 of the decorative member 3 via the dispensed adhesive 5. Of course, the flange 32 may also be located at the inner side of the sound transmission hole 11, and the outer peripheral wall of the flange 32 may be coupled to the inner peripheral wall of the sound transmission hole 11 via the dispensed adhesive.

In some embodiments of the present disclosure, as shown in FIGS. 1-5, a cover plate 4 of the housing assembly 100 may be arranged at a side of the decorative member 3 away from the electroacoustic assembly 1, and the cover plate 4 may define a sound transmission opening 41 corresponding to the sound holes 311 in the decorative member 3. For example, the portion of the decorative member 3 defining the sound holes 311 may be received in the sound transmission opening 41. Therefore, the transmission of sound may be facilitated. The cover plate 4 may be a glass cover plate 4 or a ceramic cover plate 4, so that the appearance of the housing assembly 100 may be increased.

Further, the cover plate 4 and the decorative member 3 may be coupled via a double-sided adhesive tape 6 (as shown in FIG. 1). Therefore, the reliability of the connection between the cover plate 4 and the decorative member 3 may be increased. Of course, in order to ensure the airtightness of the sound transmission passage, a foam gasket may be disposed between the cover plate 4 and the decorative member 3. Both sides of the foam gasket may be respectively coupled to the cover plate 4 and the decorative member 3 via double-sided adhesive tapes. In addition, the cover plate 4 and the decorative member 3 may also be coupled by the dispensed adhesive 5 (as shown in FIGS. 2-5). The connection by the dispensed adhesive is simple to be operated, and the structure may be simplified. Therefore, it is beneficial to reduce the cost.

Figure 6:
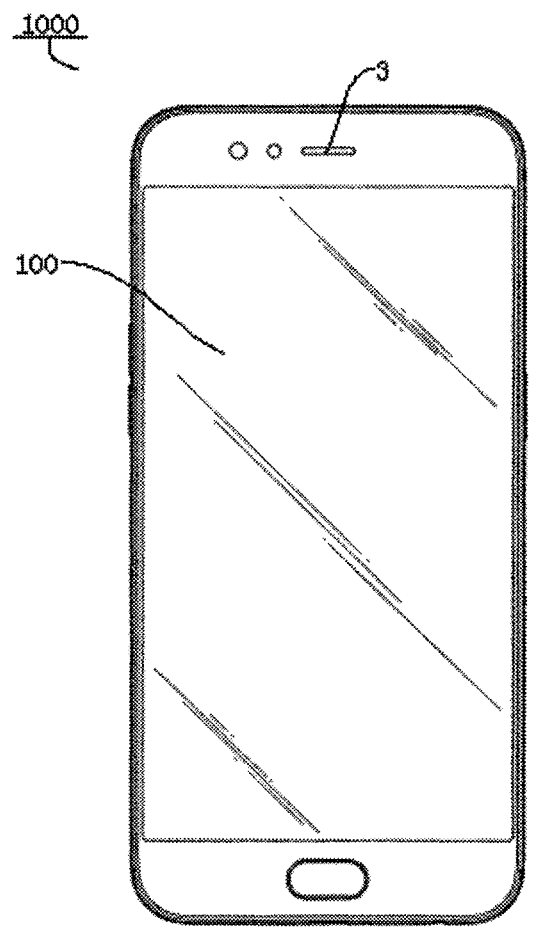
FIG. 6 is a structural schematic view of a terminal according to an embodiment of the present disclosure.

As shown in FIG. 6, a terminal 1000 according to embodiments of the present disclosure may include the above housing assembly 100.

In the terminal 1000 according to embodiments of the present disclosure, the decorative member 3 may be coupled to the electroacoustic assembly 1 by means of the dispensed adhesive 5. Accordingly, the use and assembling of auxiliary materials may be reduced, the material cost and labor cost may be reduced, the assembling process may be simplified, the assembling efficiency may be improved, and the need for disassembling operations due to improper attachment of the auxiliary materials may be avoided. Further, the airtight reliability may be enhanced.

Figure 7:
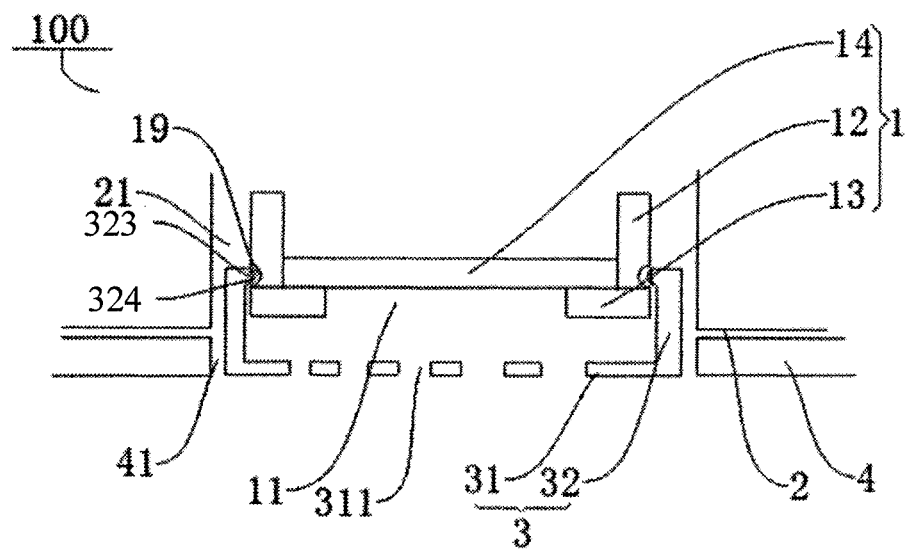
FIG. 7 is a structural schematic view of an electroacoustic assembly according to an embodiment of the present disclosure, wherein the electroacoustic assembly is a receiver assembly and a decorative member is fixed thereto via a snap structure.
Figure 8:
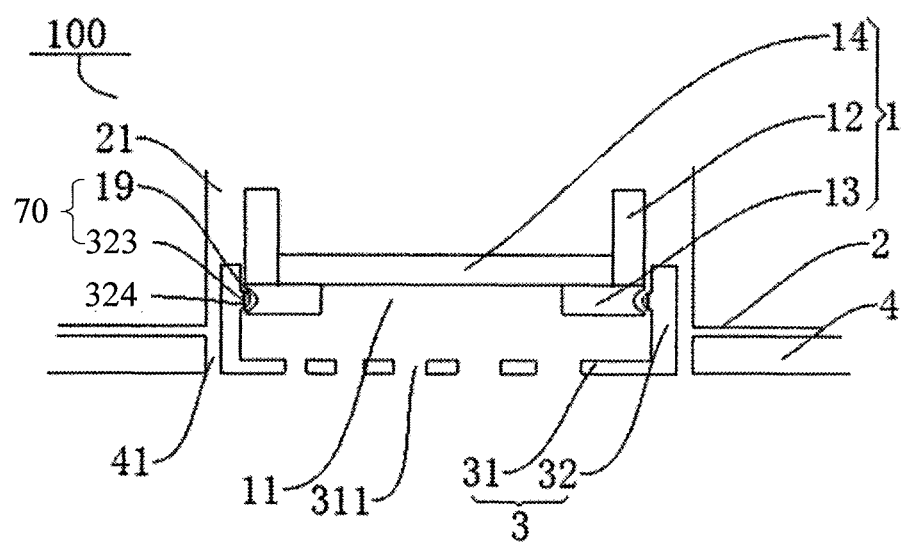
FIG. 8 is a structural schematic view of an electroacoustic assembly according to an embodiment of the present disclosure, wherein the electroacoustic assembly is a receiver assembly and a decorative member is fixed thereto via a snap structure.
Figure 9:
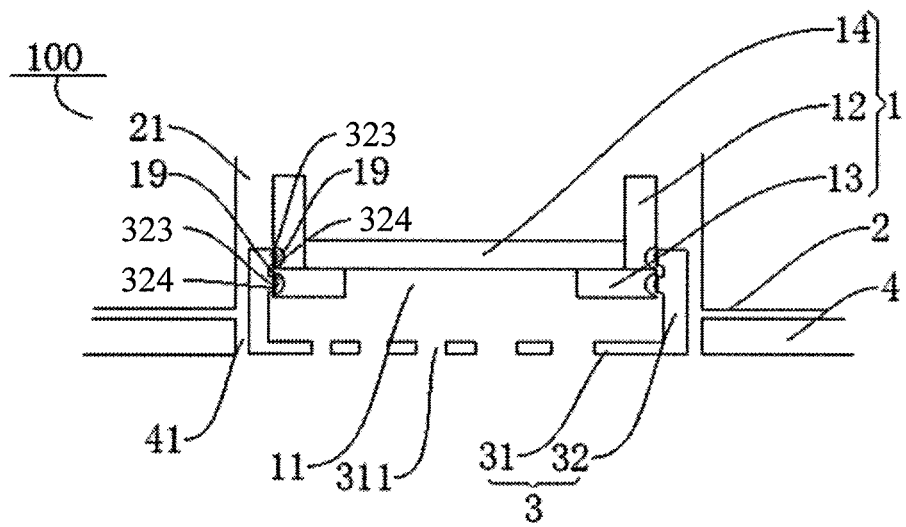
FIG. 9 is a structural schematic view of an electroacoustic assembly according to an embodiment of the present disclosure, wherein the electroacoustic assembly is a receiver assembly and a decorative member is fixed thereto via a snap structure.
Figure 10:
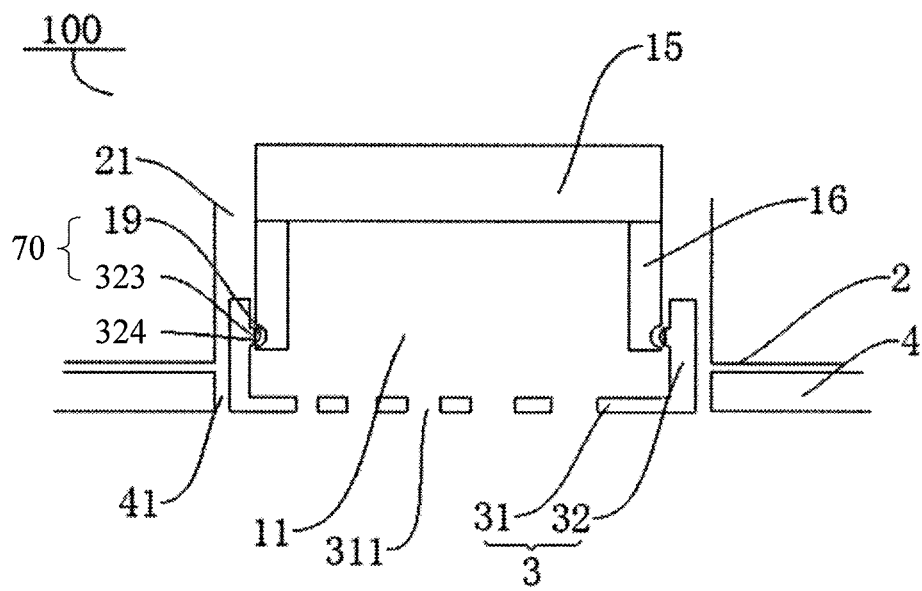
FIG. 10 is a structural schematic view of an electroacoustic assembly according to an embodiment of the present disclosure, wherein the electroacoustic assembly is a speaker assembly and a decorative member is fixed thereto via a snap structure.
Figure 11:
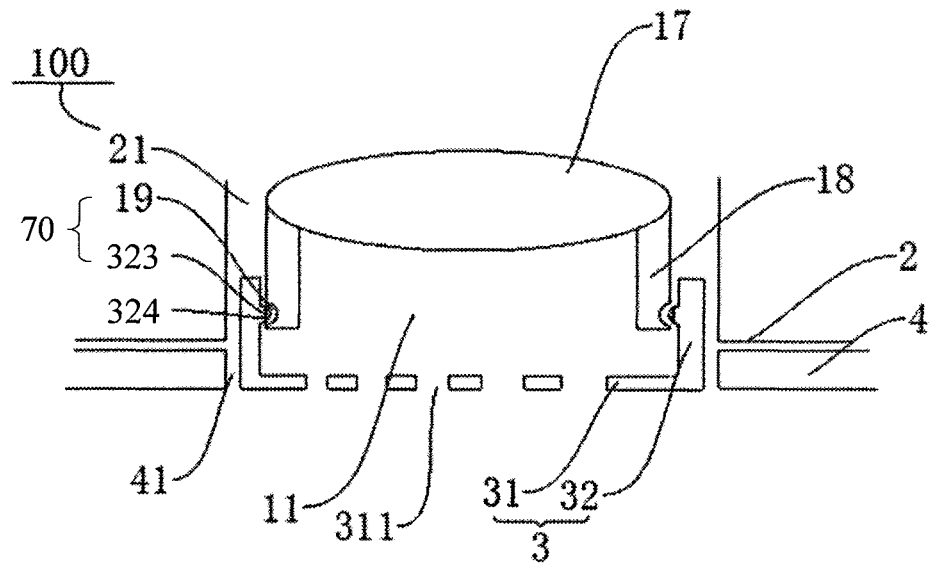
FIG. 11 is a structural schematic view of an electroacoustic assembly according to an embodiment of the present disclosure, wherein the electroacoustic assembly is a microphone assembly and a decorative member is fixed thereto via a snap structure.

Referring to FIGS. 7-11, the housing assembly 100 shown therein may be similar to the above housing assembly 100 shown in FIGS. 1-6 except that the decorative member 3 may be fixed to the electroacoustic assembly 1 via a snap structure 70 (labeled in FIGS. 8 and 10-11). Specifically, as shown in FIGS. 7-11, the electroacoustic assembly 1 may be arranged on the middle frame 2, and the electroacoustic assembly 1 may define a sound transmission hole 11. The sound transmission hole 11 has a function of transmitting sound, and can transmit outside sound into the electroacoustic assembly 1 or transmit sound produced by the electroacoustic assembly 1 out. The decorative member 3 may be opposite to the sound transmission hole 11, and the decorative member 3 may be fixed to the electroacoustic assembly 1 via the snap structure 70.

In some embodiments of the present disclosure, a snap protrusion 323 may be provided on one of the electroacoustic assembly and the decorative member, and a snap groove 19 mated with the snap protrusion 323 may be defined on the other of the electroacoustic assembly and the decorative member. As shown in FIGS. 7-11, the snap protrusion 323 may be arranged on the decorative member 3, and the snap groove 19 may be defined on the electroacoustic assembly 1. Of course, the present disclosure is not limited thereto, the decorative member may be provided with the snap groove 19, and the electroacoustic assembly may be provided with the snapping protrusion 323 that mates with the snap groove 19.

Further, as shown in FIGS. 7-11, a seal ring 324 may be disposed between the snap protrusion 323 and the snap groove 19. Thereby, the airtightness of the sound transmission passage can be increased, and the quality of sound transmission can be improved. Specifically, the seal ring 324 may be a rubber ring or a silicone ring. The rubber ring and the silicone ring are widely used, the cost thereof may be low, and the material properties thereof are good, which may be beneficial to the airtightness of the sound transmission passage and can improve the quality of sound transmission.

In some embodiments of the present disclosure, as shown in FIGS. 7-11, the decorative member 3 may include a metal mesh 31 and a flange 32, and the flange 32 may be provide at an edge of the metal mesh 31. The metal mesh 31 and the flange 32 can be integrally formed, or can be fixed by the dispensed adhesive. The metal mesh 31 may define a plurality of sound holes 311 for passing sound. The flange 32 may be coupled to the electroacoustic assembly 1 via the snap structure 70. Therefore, the connection between the decorative member 3 and the electroacoustic assembly 1 is facilitated.

In some embodiments of the present disclosure, as shown in FIGS. 7-9, the electroacoustic assembly 1 may be a receiver assembly which may include a bracket 12, a closure plate 13 and a vibrating diaphragm 14. The closure plate 13 may be arranged on the bracket 12, the sound transmission hole 11 may be defined in the closure plate 13, the decorative member 3 may be located at a side of the closure plate 13 that is away from the bracket 12, and the decorative member 3 may be coupled to at least one of the bracket 12 and the closure plate 13 by means of the snap structure 70.

As shown in FIG. 7, an inner peripheral wall of the flange 32 of the decorative member 3 may include the snap protrusion 323, an outer peripheral wall of the bracket 12 may define the snap groove 19 for mating with the snap protrusion 323, and the snap protrusion 323 mates with the snap groove 19 so as to achieve the connection between the decorative member 3 and the receiver assembly. Of course, as shown in FIG. 8, the inner peripheral wall of the flange 32 of the decorative member 3 may include the snap protrusion 323, an outer peripheral wall of the closure plate 13 may define the snap groove 19, and the snap protrusion 323 mates with the snap groove 19 so as to achieve the connection between the decorative member 3 and the receiver assembly. Of course, as shown in FIG. 9, the inner peripheral wall of the flange 32 of the decorative member 3 may include two spaced snap protrusions 323, the outer peripheral wall of the closure plate 13 may define a snap groove 19 for mating with the snap protrusion 323, the outer peripheral wall of the bracket 12 may define a snap groove 19 for mating with the snap protrusion 323, and the snap protrusions 323 mate with the snap grooves 19 so as to achieve the connection between the decorative member 3 and the receiver assembly.

In some embodiments of the present disclosure, as shown in FIG. 10, the electroacoustic assembly 1 may be a speaker assembly including a speaker 15 and a sound transmission part 16. As shown in FIG. 10, the flange 32 of the decorative member 3 may be perpendicular to the metal mesh 31. The sound transmission part 16 may be located at an inner side of the flange 32. The inner peripheral wall of the flange 32 of the decorative member 3 may include the snap protrusion 323, the outer peripheral wall of the sound transmission part 16 may define the snap groove 19 for mating with the snap protrusion 323, and the snap protrusion 323 mates with the snap groove 19 so as to achieve the connection between the decorative member 3 and the speaker assembly.

In some embodiments of the present disclosure, as shown in FIG. 11, the electroacoustic assembly 1 may be a microphone assembly including a microphone 17 and a shielding case 18. The shielding case 18 may be arranged on the microphone 17, and the sound transmission hole 11 may be defined in the shielding case 18. The decorative member 3 may be located at a side of the shielding case 18 away from the microphone 17, and the decorative member 3 may be coupled to the shielding case 18 by means of the snap structure 70. The inner peripheral wall of the flange 32 of the decorative member 3 may include the snap protrusion 323, the outer peripheral wall of the shielding case 18 may define the snap groove 19 for mating with the snap protrusion 323, and the snap protrusion 323 mates with the snap grooves 19 so as to achieve the connection between the decorative member 3 and the microphone assembly.

Referring to FIGS. 12-17, the housing assembly 100 shown therein may be similar to the above housing assembly 100 shown in FIGS. 1-6 except that the decorative member 3 may be fixed to the electroacoustic assembly 1 via a screw structure 72. Specifically, as shown in FIGS. 12-17, the electroacoustic assembly 1 may be arranged on the middle frame 2, and the electroacoustic assembly 1 may define a sound transmission hole 11. The decorative member 3 may be opposite to the sound transmission hole 11, and the decorative member 3 may be fixed to the electroacoustic assembly 1 via the screw structure 72.

In some embodiments of the present disclosure, as shown in FIGS. 12-17, the flange 32 may be coupled to the electroacoustic assembly 1 via the screw structure 72. Therefore, the connection between the decorative member 3 and the electroacoustic assembly 1 may be facilitated.

In some embodiments of the present disclosure, as shown in FIGS. 12-15, the electroacoustic assembly 1 may be a receiver assembly which may include a bracket 12, a closure plate 13 and a vibrating diaphragm 14. The closure plate 13 may be arranged on the bracket 12, the sound transmission hole 11 may be defined in the closure plate 13, the decorative member 3 may be located at a side of the closure plate 13 that is away from the bracket 12, and the decorative member 3 may be coupled to at least one of the bracket 12 and the closure plate 13 by means of the screw structure 72.

Figure 12:
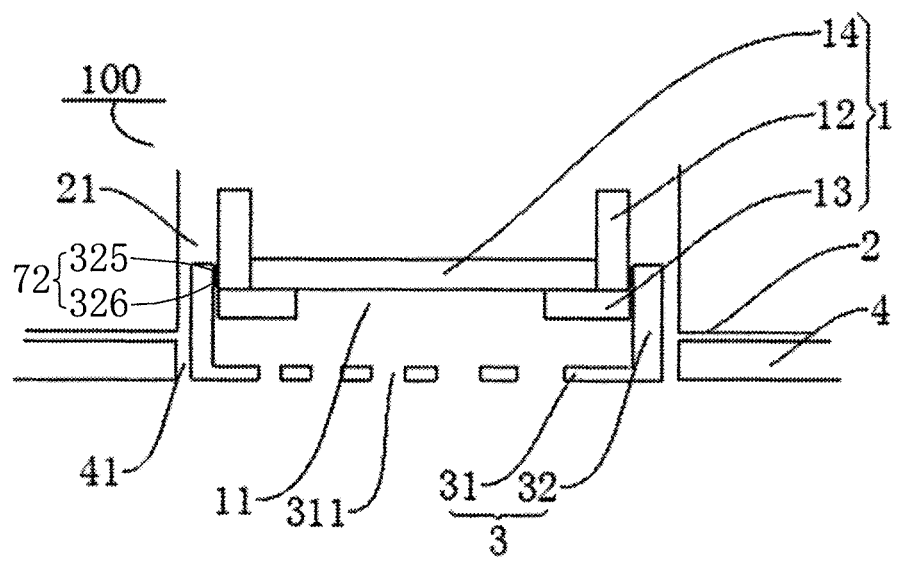
FIG. 12 is a structural schematic view of an electroacoustic assembly according to an embodiment of the present disclosure, wherein the electroacoustic assembly is a receiver assembly and a decorative member is fixed thereto via a screw structure.
Figure 13:
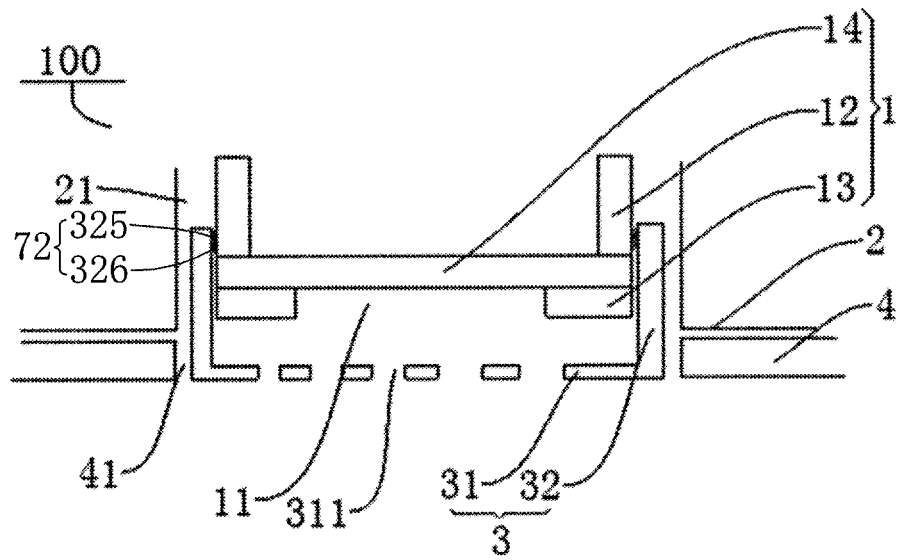
FIG. 13 is a structural schematic view of an electroacoustic assembly according to an embodiment of the present disclosure, wherein the electroacoustic assembly is a receiver assembly and a decorative member is fixed thereto via a screw structure.
Figure 14:
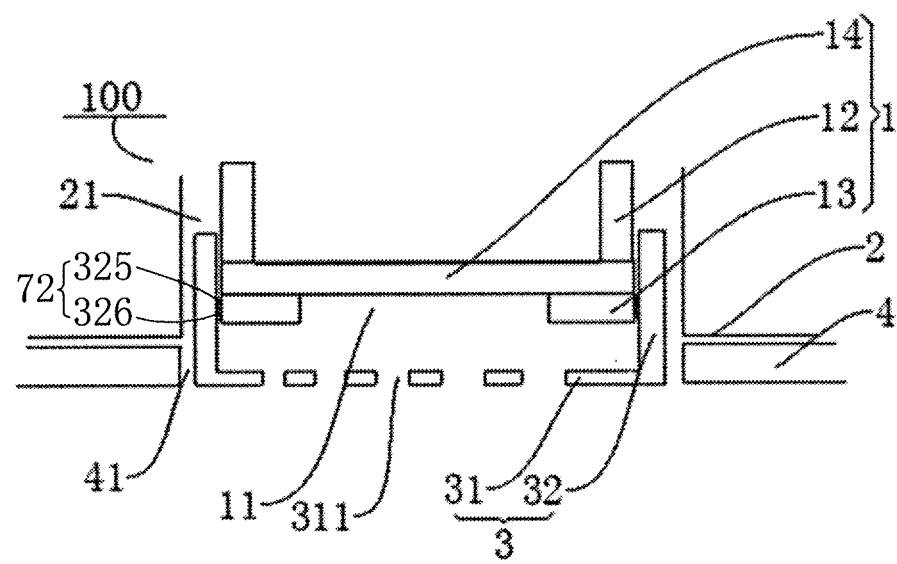
FIG. 14 is a structural schematic view of an electroacoustic assembly according to an embodiment of the present disclosure, wherein the electroacoustic assembly is a receiver assembly and a decorative member is fixed thereto via a screw structure.
Figure 15:
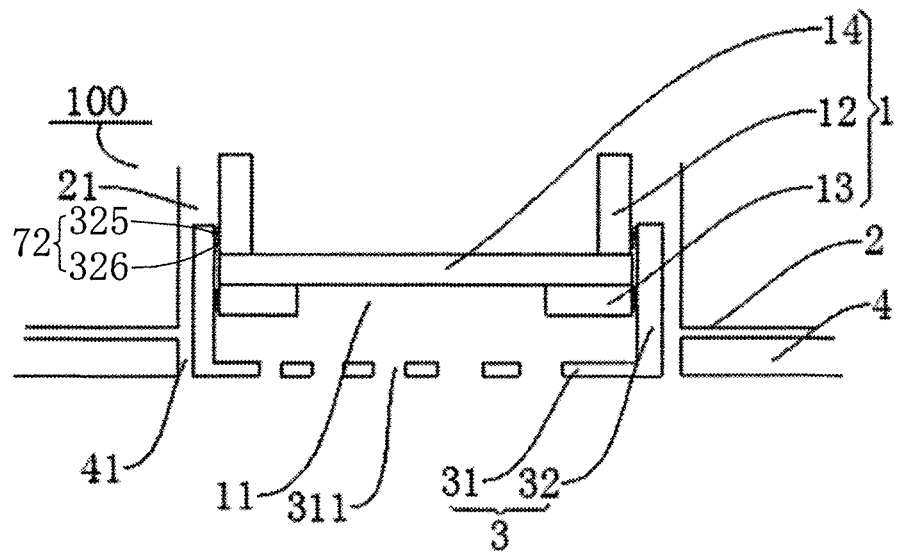
FIG. 15 is a structural schematic view of an electroacoustic assembly according to an embodiment of the present disclosure, wherein the electroacoustic assembly is a receiver assembly and a decorative member is fixed thereto via a screw structure.

As shown in FIGS. 12-13, an inner peripheral wall of the flange 32 of the decorative member 3 may include an internal thread 325, an outer peripheral wall of the bracket 12 may include an external thread 326, and the internal thread 325 mates with the external thread 326 so as to achieve the connection between the decorative member 3 and the receiver assembly. As shown in FIG. 14, the inner peripheral wall of the flange 32 of the decorative member 3 may include the internal thread 325, an outer peripheral wall of the closure plate 13 may include the external thread 326, and the internal thread 325 mates with the external thread 326 so as to achieve the connection between the decorative member 3 and the receiver assembly. As shown in FIG. 15, the inner peripheral wall of the flange 32 of the decorative member 3 may include the internal threads 325, the outer peripheral wall of the closure plate 13 and the outer peripheral wall of the bracket 12 may include the external threads 326, and the internal threads 325 mate with the external threads 326 so as to achieve the connection between the decorative member 3 and the receiver assembly.

Figure 16:
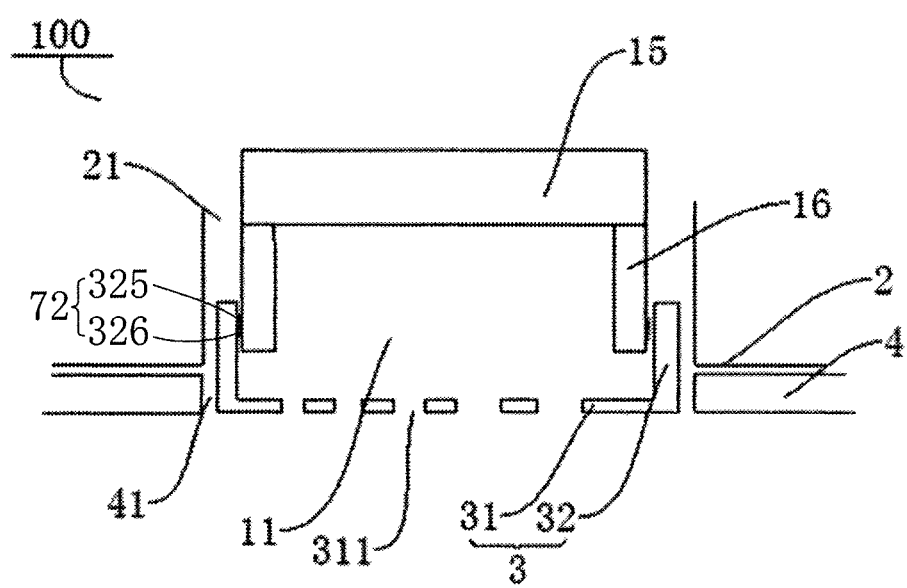
FIG. 16 is a structural schematic view of an electroacoustic assembly according to an embodiment of the present disclosure, wherein the electroacoustic assembly is a speaker assembly and a decorative member is fixed thereto via a screw structure.

In some embodiments of the present disclosure, as shown in FIG. 16, the electroacoustic assembly 1 may be a speaker assembly including a speaker 15 and a sound transmission part 16. The sound transmission part 16 may be arranged on the speaker 15, and the sound transmission hole 11 may be defined in the sound transmission part 16. The decorative member 3 may be located at a side of the sound transmission part 16 away from the speaker 15, and the decorative member 3 may be coupled to the sound transmission part 16 by means of the screw structure 72. The inner peripheral wall of the flange 32 of the decorative member 3 may include the internal thread 325, the outer peripheral wall of the sound transmission part 16 may include the external thread 326, and the internal thread 325 mates with the external thread 326 so as to achieve the connection between the decorative member 3 and the speaker assembly.

Figure 17:
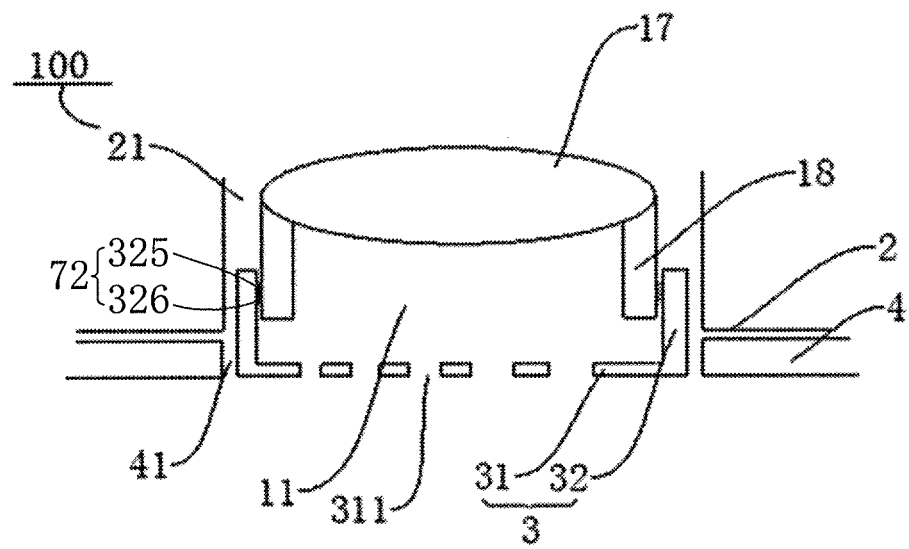
FIG. 17 is a structural schematic view of an electroacoustic assembly according to an embodiment of the present disclosure, wherein the electroacoustic assembly is a microphone assembly and a decorative member is fixed thereto via a screw structure.

In some embodiments of the present disclosure, as shown in FIG. 17, the electroacoustic assembly 1 may be a microphone assembly including a microphone 17 and a shielding case 18. The shielding case 18 may be arranged on the microphone 17, and the sound transmission hole 11 may be defined in the shielding case 18. The decorative member 3 may be located at a side of the shielding case 18 away from the microphone 17, and the decorative member 3 may be coupled to the shielding case 18 by means of the screw structure 72. The inner peripheral wall of the flange 32 of the decorative member 3 may include the internal thread 325, the outer peripheral wall of the shielding case 18 may include the external thread 326, and the internal thread 325 mates with the external thread 326 so as to achieve the connection between the decorative member 3 and the microphone assembly.

Referring to FIGS. 18-22, the housing assembly 100 shown therein may be similar to the above housing assembly 100 shown in FIGS. 1-6 except that the decorative member 3 may be fixed to the electroacoustic assembly 1 via a welded part 74. Specifically, as shown in FIGS. 18-22, the electroacoustic assembly 1 may be arranged on the middle frame 2, and the electroacoustic assembly 1 may define a sound transmission hole 11. The sound transmission hole 11 has a function of transmitting sound, and can transmit outside sound into the electroacoustic assembly 1 or transmit sound produced by the electroacoustic assembly 1 out. At least part of the electroacoustic assembly 1 may be a metal part. The metal decorative member 3 may be opposite to the sound transmission hole 11, and the metal decorative member 3 may be fixed to the electroacoustic assembly 1 via the welded part 74.

In some embodiments of the present disclosure, as shown in FIGS. 18-22, the flange 32 may be coupled to the electroacoustic assembly 1 via the welded part 74. Therefore, the connection between the metal decorative member 3 and the electroacoustic assembly 1 may be facilitated.

In some embodiments of the present disclosure, at least one of a connection surface of the metal decorative member 3 for coupling to the electroacoustic assembly 1, and a connection surface of the electroacoustic assembly 1 for coupling to the metal decorative member 3 may be a curved surface. In other words, only the connection surface of the metal decorative member 3 for coupling to the electroacoustic assembly 1 may be the curved surface, only the connection surface of the electroacoustic assembly 1 for coupling to the metal decorative member 3 may be the curved surface, or both the connection surface of the metal decorative member 3 for coupling to the electroacoustic assembly 1 and the connection surface of the electroacoustic assembly 1 for coupling to the metal decorative member 3 may be curved surfaces. The curved surface can be an arc surface or a wavy surface. Alternatively, a groove structure can be arranged on a planar surface to form a curved surface; i.e., at least one of the connection surface of the metal decorative member 3 for coupling to the electroacoustic assembly 1 and the connection surface of the electroacoustic assembly 1 for coupling to the metal decorative member 3 may be provided with the groove structure. As a result, the welded area can be increased, and the reliability of the connection between the electroacoustic assembly 1 and the metal decorative member 3 can be improved.

Figure 18:
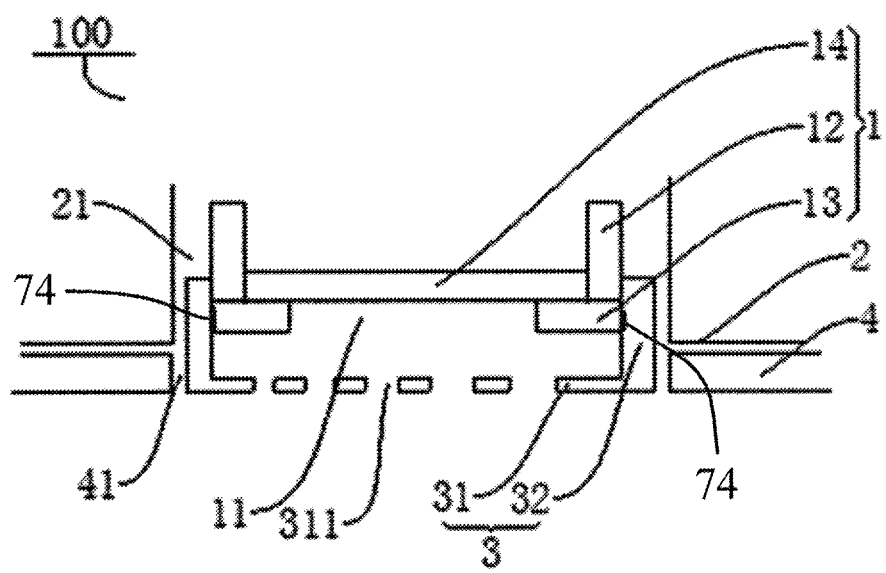
FIG. 18 is a structural schematic view of an electroacoustic assembly according to an embodiment of the present disclosure, wherein the electroacoustic assembly is a receiver assembly and a decorative member is fixed thereto via a welded part.
Figure 19:
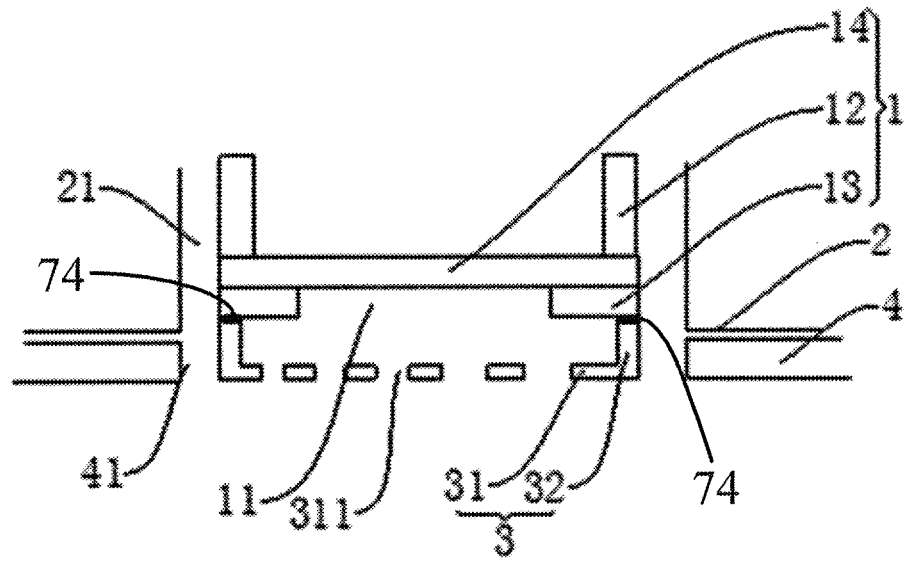
FIG. 19 is a structural schematic view of an electroacoustic assembly according to an embodiment of the present disclosure, wherein the electroacoustic assembly is a receiver assembly and a decorative member is fixed thereto via a welded part.
Figure 20:
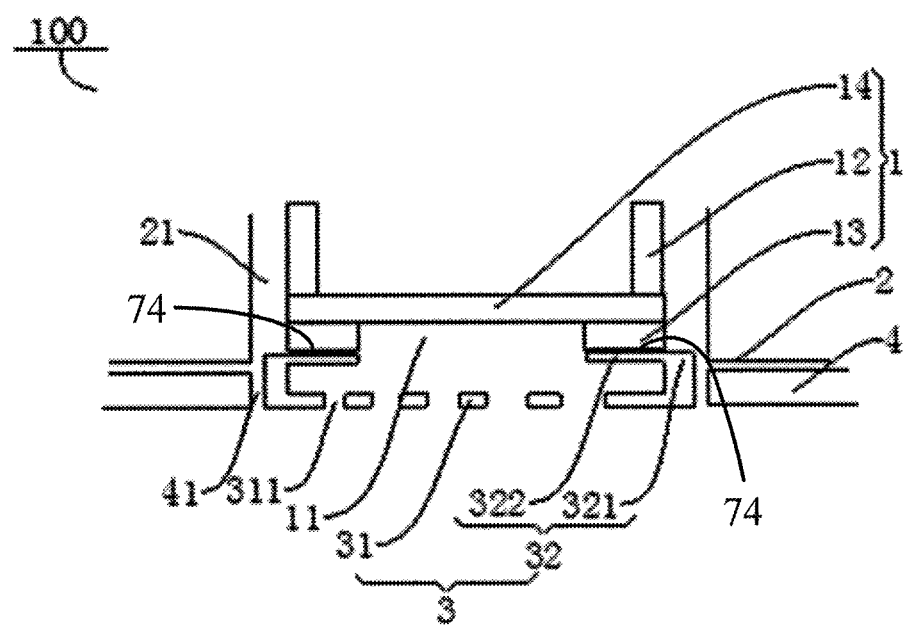
FIG. 20 is a structural schematic view of an electroacoustic assembly according to an embodiment of the present disclosure, wherein the electroacoustic assembly is a receiver assembly and a decorative member is fixed thereto via a welded part.

In some embodiments of the present disclosure, as shown in FIGS. 18-20, the electroacoustic assembly 1 may be a receiver assembly which may include a bracket 12, a closure plate 13 and a vibrating diaphragm 14. The closure plate 13 may be arranged on the bracket 12, the sound transmission hole 11 may be defined in the closure plate 13, the metal decorative member 3 may be located at a side of the closure plate 13 that is away from the bracket 12, at least part of the closure plate 13 may be a metal part, and the metal decorative member 3 may be coupled to the closure plate 13 by means of the welded part 74. Of course, the whole of the closure plate 13 can be a metal part so as to facilitate the machining and processing of the closure plate 13.

As shown in FIG. 18, the flange 32 of the metal decorative member 3 may be perpendicular to the metal mesh 31, the closure plate 13 and the bracket 12 may be located at an inner side of the flange 32, an outer peripheral wall of the closure plate 13 can be a metal part, and an inner peripheral wall of the flange 32 of the metal decorative member 3 may be coupled to the outer peripheral wall of the closure plate 13 via the welded part 74 so as to achieve the connection between the metal decorative member 3 and the receiver assembly. As shown in FIG. 19, the flange 32 of the metal decorative member 3 may be perpendicular to the metal mesh 31, a side surface of the closure plate 13 towards the metal decorative member 3 can be a metal part, and the flange 32 of the metal decorative member 3 may be coupled to the side surface of the closure plate 13 towards the metal decorative member 3 via the welded part 74 so as to achieve the connection between the metal decorative member 3 and the receiver assembly.

In addition, as shown in FIG. 20, the flange 32 of the metal decorative member 3 comprises a vertical segment 321 and a horizontal segment 322. One end of the vertical segment 321 couples to the metal mesh 31, the other end of the vertical segment 321 couples to one end of the horizontal segment 322, and the other end of the horizontal segment 322 extends towards a central axis of the metal decorative member 3. The horizontal segment 322 may be perpendicular to the vertical segment 321, and may be parallel to the metal mesh 31. A side surface of the closure plate 13 towards the metal decorative member 3 can be a metal part. The horizontal segment 322 may be coupled to the side surface of the closure plate 13 towards the metal decorative member 3 via the welded part 74.

Figure 21:
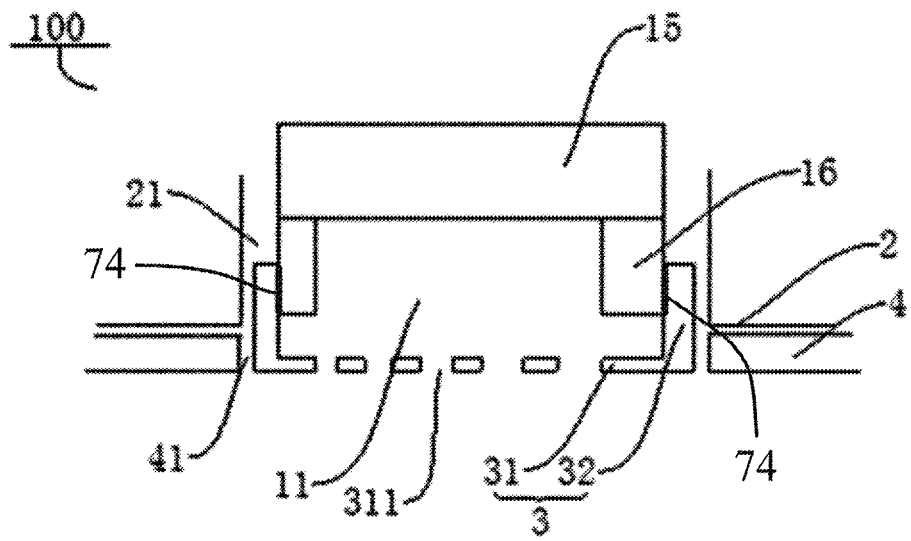
FIG. 21 is a structural schematic view of an electroacoustic assembly according to an embodiment of the present disclosure, wherein the electroacoustic assembly is a speaker assembly and a decorative member is fixed thereto via a welded part.

In some embodiments of the present disclosure, as shown in FIG. 21, the electroacoustic assembly 1 may be a speaker assembly including a speaker 15 and a sound transmission part 16. The sound transmission part 16 may be arranged on the speaker 15, and the sound transmission hole 11 may be defined in the sound transmission part 16. The metal decorative member 3 may be located at a side of the sound transmission part 16 away from the speaker 15, at least part of the sound transmission part 16 may be a metal part, and the metal decorative member 3 may be coupled to the sound transmission part 16 by means of the welded part 74. Of course, the whole of the sound transmission part 16 can be a metal part so as to facilitate the machining and processing of the sound transmission part 16.

As shown in FIG. 21, the flange 32 of the metal decorative member 3 may be perpendicular to the metal mesh 31. The sound transmission part 16 may be located at an inner side of the flange 32, an outer peripheral wall of the sound transmission part 16 can be a metal part, and the outer peripheral wall of the sound transmission part 16 may be connected to an inner peripheral wall of the flange 32 of the metal decorative member 3 via the welded part 74. Of course, the flange 32 may also be located at the inner side of the sound transmission hole 11, and the outer peripheral wall of the flange 32 may be coupled to the inner peripheral wall of the sound transmission hole 11 via the welded part 74.

Figure 22:
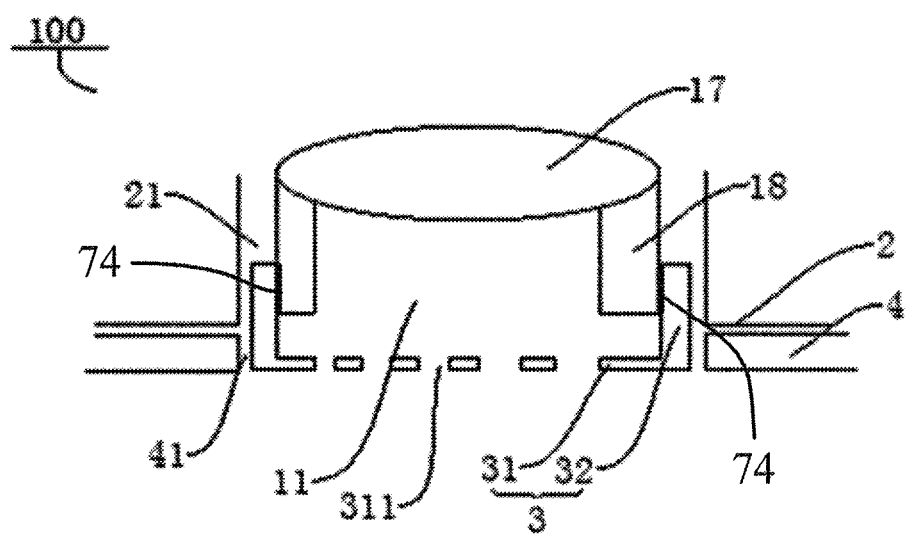
FIG. 22 is a structural schematic view of an electroacoustic assembly according to an embodiment of the present disclosure, wherein the electroacoustic assembly is a microphone assembly and a decorative member is fixed thereto via a welded part.

In some embodiments of the present disclosure, as shown in FIG. 22, the electroacoustic assembly 1 may be a microphone assembly including a microphone 17 and a shielding case 18. The shielding case 18 may be arranged on the microphone 17, and the sound transmission hole 11 may be defined in the shielding case 18. The metal decorative member 3 may be located at a side of the shielding case 18 away from the microphone 17, at least part of the shielding case 18 may be a metal part, and the metal decorative member 3 may be coupled to the shielding case 18 by means of the welded part 74. Of course, the whole of the shielding case 18 can be a metal part so as to facilitate the machining and processing of the shielding case 18.

As shown in FIG. 22, the flange 32 of the metal decorative member 3 may be perpendicular to the metal mesh 31. The shielding case 18 may be located at the inner side of the flange 32, an outer peripheral wall of the shielding case 18 may be a metal part, and the outer peripheral wall of the shielding case 18 may be coupled to the inner peripheral wall of the flange 32 of the metal decorative member 3 via the welded part 74. Of course, the flange 32 may also be located at the inner side of the sound transmission hole 11, and the outer peripheral wall of the flange 32 may be coupled to the inner peripheral wall of the sound transmission hole 11 via the welded part 74.

Referring to FIGS. 23-27, the housing assembly 100 shown therein may be similar to the above housing assembly 100 shown in FIGS. 1-6 except that the decorative member 3 may be integrally formed on the electroacoustic assembly 1. Specifically, as shown in FIGS. 23-27, the electroacoustic assembly 1 may be arranged on the middle frame 2, and the electroacoustic assembly 1 may define a sound transmission hole 11. The decorative member 3 may be opposite to the sound transmission hole 11, and the decorative member 3 may be integrally formed on the electroacoustic assembly 1. In other words, the decorative member 3 may be opposite to the sound transmission hole 11, and the decorative member 3 may be integrally formed with one or more parts of the electroacoustic assembly 1.

In some embodiments of the present disclosure, as shown in FIGS. 23-27, the decorative member 3 may include a metal mesh 31 and a flange 32, and the flange 32 may be provide at an edge of the metal mesh 31. The metal mesh 31 and the flange 32 can be integrally formed, or can be fixed by the dispensed adhesive. The metal mesh 31 may define a plurality of sound holes 311 for passing sound.

Figure 23:
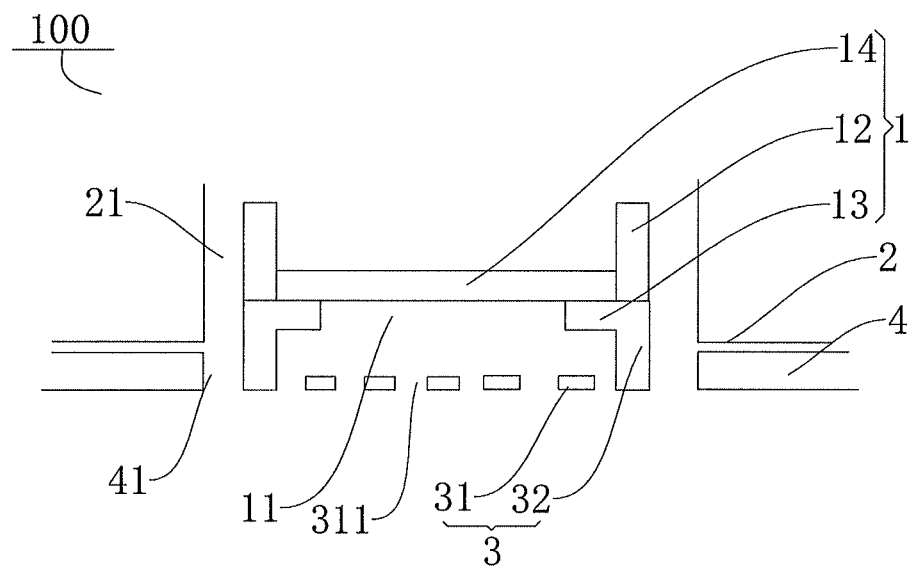
FIG. 23 is a structural schematic view of an electroacoustic assembly according to an embodiment of the present disclosure, wherein the electroacoustic assembly is a receiver assembly and a decorative member is integrally formed thereon.
Figure 24:
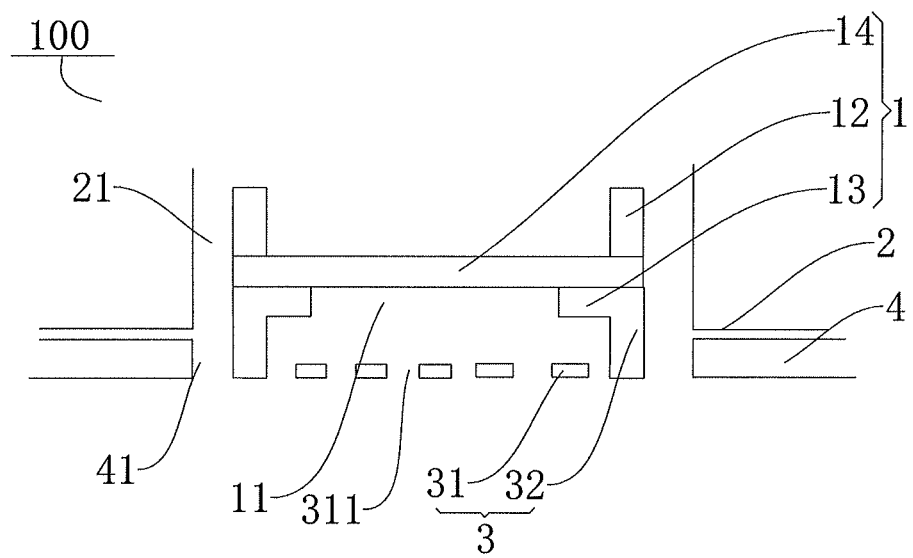
FIG. 24 is a structural schematic view of an electroacoustic assembly according to an embodiment of the present disclosure, wherein the electroacoustic assembly is a receiver assembly and a decorative member is integrally formed thereon.
Figure 25:
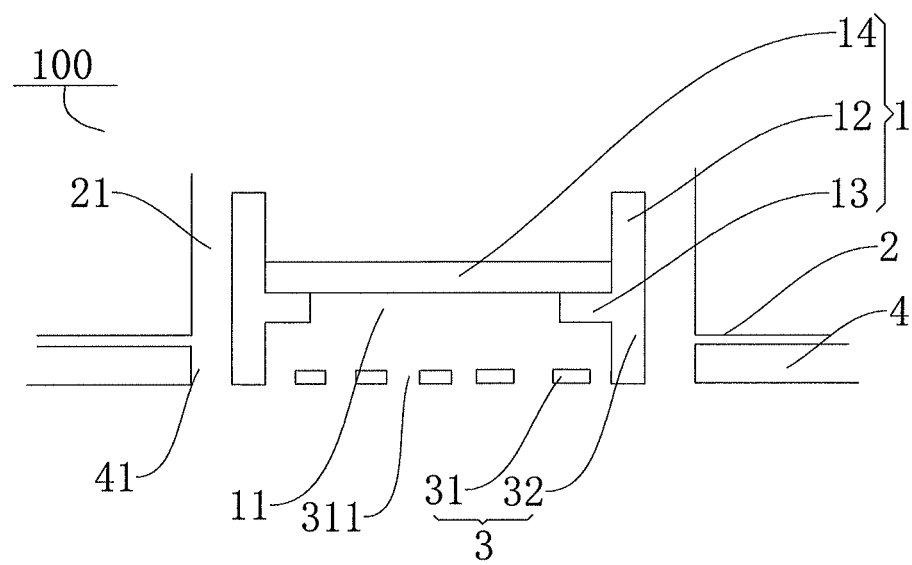
FIG. 25 is a structural schematic view of an electroacoustic assembly according to an embodiment of the present disclosure, wherein the electroacoustic assembly is a receiver assembly and a decorative member is integrally formed thereon.

In some embodiments of the present disclosure, as shown in FIGS. 23-25, the electroacoustic assembly 1 may be a receiver assembly which may include a bracket 12, a closure plate 13 and a vibrating diaphragm 14. The closure plate 13 may be arranged on the bracket 12, the sound transmission hole 11 may be defined in the closure plate 13, the decorative member 3 may be located at a side of the closure plate 13 that is away from the bracket 12, and the decorative member 3 may be integrally formed on at least one of the bracket 12 and the closure plate 13.

As shown in FIGS. 23-24, the decorative member 3 may be integrally formed on the closure plate 13, each of the closure plate 13 and the decorative member 3 can be a metal part, and the decorative member 3 and the closure plate 13 can be an integrally formed part. Of course, the decorative member 3 can also be integrally formed on the bracket 12. Since the bracket 12 may be generally a plastic member, the decorative member 3 can be pre-buried in a mold and formed integrally with the bracket 12 during processing and assembling. Of course, the decorative member 3 can also be integrally formed on the closure plate 13 and the bracket 12; wherein the decorative member 3 and the closure plate 13 can be integrally formed at first, and then the integrally formed decorative member 3 and the closure plate 13 may be embedded in a mold and may be integrally formed with the bracket 12. Thus, the decorative member 3, the closure plate 13 and the bracket 12 may be integrally formed.

Figure 26:
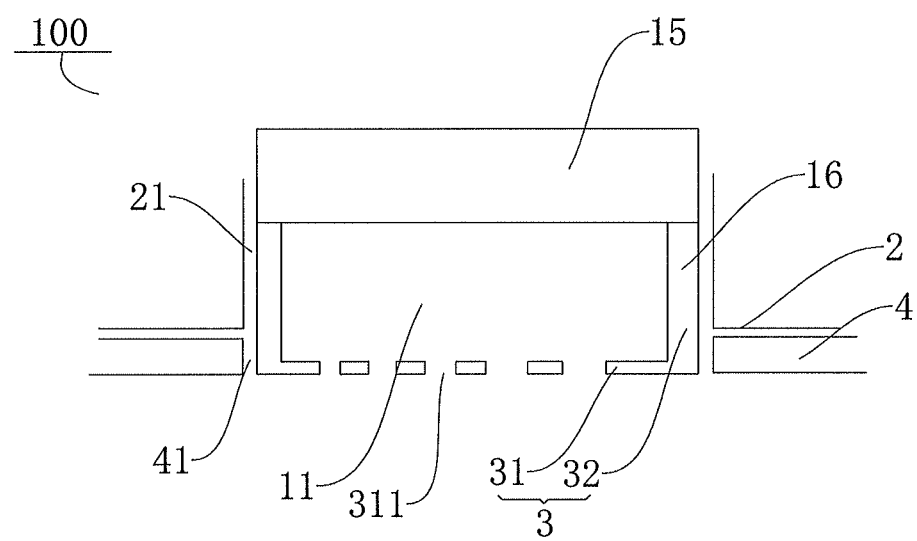
FIG. 26 is a structural schematic view of an electroacoustic assembly according to an embodiment of the present disclosure, wherein the electroacoustic assembly is a speaker assembly and a decorative member is integrally formed thereon.

In some embodiments of the present disclosure, as shown in FIG. 26, the electroacoustic assembly 1 may be a speaker assembly including a speaker 15 and a sound transmission part 16. The sound transmission part 16 may be arranged on the speaker 15, and the sound transmission hole 11 may be defined in the sound transmission part 16. The decorative member 3 may be located at a side of the sound transmission part 16 away from the speaker 15, and the decorative member 3 may be integrally formed on the sound transmission part 16. The decorative member 3 and the sound transmission part 16 can be an integrally formed part.

Figure 27:
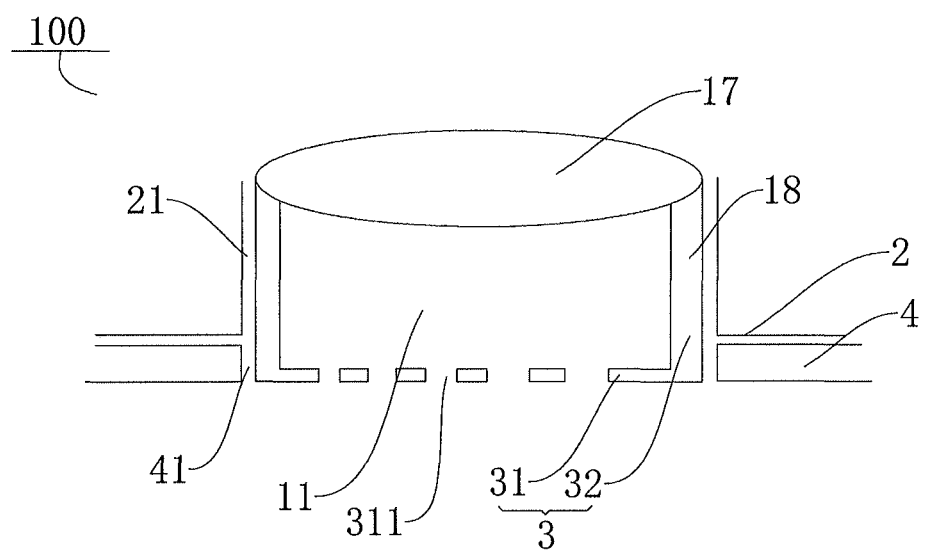
FIG. 27 is a structural schematic view of an electroacoustic assembly according to an embodiment of the present disclosure, wherein the electroacoustic assembly is a microphone assembly and a decorative member is integrally formed thereon.

In some embodiments of the present disclosure, as shown in FIG. 27, the electroacoustic assembly 1 may be a microphone assembly including a microphone 17 and a shielding case 18. The shielding case 18 may be arranged on the microphone 17, and the sound transmission hole 11 may be defined in the shielding case 18. The decorative member 3 may be located at a side of the shielding case 18 away from the microphone 17, and the decorative member 3 may be integrally formed on the shielding case 18. The decorative member 3 and the shielding case 18 can be an integrally formed part.

In addition, the terminal 1000 shown in FIG. 6 may include any one of the above housing assembly 100 shown in FIGS. 7-27.

It should be understood that, the "terminal 1000" used herein includes, but is not limited to, a device that is configured to receive/transmit communication signals via a wireline connection, such as via a public-switched telephone network (PSTN), digital subscriber line (DSL), digital cable, a direct cable connection, and/or another data connection/network, and/or via a wireless interface with, for example, a cellular network, a wireless local area network (WLAN)1 a digital television network such as a DVB-H network, a satellite network, an AM-FM broadcast transmitter, and/or another communication terminal. A communication terminal that is set to communicate over a wireless interface may be referred to as a "wireless communication terminal", "wireless terminal" and/or "mobile terminal". Examples of the mobile terminal include, but are not limited to, a satellite or cellular radiotelephone; a Personal Communications System (PCS) terminal that may combine a cellular radiotelephone with data processing, facsimile and data communications capabilities; a PDA that can include a radiotelephone, pager, Internet/intranet access, Web browser, organizer, calendar and/or a global positioning system (GPS) receiver; and a conventional laptop and/or palmtop receiver or other appliance that includes a radiotelephone transceiver.

In embodiments of the present disclosure, the terminal 1000 may be various devices capable of acquiring data from outside and processing the data. Alternatively, the terminal 1000 may be a device which has a battery and can acquire current from an external device to charge the battery, for example, the terminal may be a mobile phone, a tablet computer, a computing device, an information display device, etc.

For the convenience of description, a mobile phone is taken as an example of the terminal 1000 of the present disclosure. In this embodiment, the mobile phone can include a radio frequency circuit, a memory, an input unit, a wireless fidelity (Wi-Fi) module, a display unit, a sensor, an audio circuit, a processor, a projection unit, a shooting unit, a battery and other components.

The radio frequency circuit may be configured to receive and transmit a signal during information transmission and reception or during a call. In special, the radio frequency circuit sends downlink information to the processor after receiving the downlink information from a base station, and transmits uplink data to the base station. Usually, the radio frequency circuit includes, but is not limited to, an antenna, at least one amplifier, a transceiver, a coupler, a low noise amplifier, a duplexer and so on. In addition, the radio frequency circuit may further communicate with other devices via wireless communication and a network. The wireless communication may use any one communication standard or protocol, including, but not limited to, Global System for Mobile communication (GSM), General Packet Radio Service (GPRS), Code Division Multiple Access (CDMA), Wideband Code Division Multiple Access (WCDMA), Long Term Evolution (LTE), E-mail, Short Messaging Service (SMS) and so on.

The memory may be configured to store software programs and modules, and the processor executes various function applications and data processing of the mobile phone by running the software programs and the modules stored in the memory. The memory may mainly include a program storage region and a data storage region, the storage program region may store an operation system, application programs for at least one function (for example, an audio playing function, an image playing function, etc.) and so on; and the data storage region may store data (for example, audio data, telephone directory, etc.) created according to use of the mobile phone. In addition, the memory may include a high-speed random access memory, and may further include a non-volatile memory such as one of at least a disk storage device, a flash device, or other non-volatile solid storage devices.

The input unit may be configured to receive input digital or character information and generate key signal input associated with user setting and functional control of the mobile phone. Specifically, the input unit may include a touch panel and other input devices. The touch panel is also named as touch screen, which is configured to collect touch operations thereon or there-near (such as an operation made by the user on the touch panel or near the touch panel by means of a finger, a touch pen or any other suitable object or accessory), and drive corresponding connection devices according to preset programs. Optionally, the touch panel may include two parts: a touch detection apparatus and a touch controller. The touch detection apparatus detects a touch operation by a user, converts the detected touch operation into an electrical signal, and transmits the electrical signal to the touch controller. The touch controller receives the electrical signal from the touch detection apparatus, converts the electrical signal into coordinates of a touch point, and then sends the coordinates to the processor. The touch controller may also receive and execute a command sent by the processor. In addition, the touch panel may be a resistive, capacitive, infrared, or surface acoustic wave touch panel. The other input devices may include, but are not limited to, one or more of a physical keyboard, a functional key (such as a volume control key and a switch key), a track ball, a mouse, and an operating rod.

The display unit may be configured to display information input by the user or information provided to the user and various menus of the mobile phone. The display unit may include a display screen, which may be in a form of LCD (Liquid Crystal Display), OLED (Organic Light-Emitting Diode), etc. Further, the touch panel can cover the display screen, when the touch operation on or near the touch panel is detected, the touch panel will transmit the touch operation to the processor to determine the type of touch event; thereafter, the processor can provide a corresponding visual output on the display screen according to the type of the touch event.

The position of the display screen for displaying visual output which can be recognized by user's eyes is the "display region". The touch panel and the display screen can be used as two independent elements to realize input and output function of the mobile phone, and the touch panel and the display screen can also be integrated together to realize input and output function of the mobile phone.

In addition, the mobile phone may further include a sensor such as an attitude sensor, a light sensor and the like.

Specifically, the attitude sensor can also be referred to as a motion sensor, and as one of the motion sensors, a gravity sensor can be employed. As for the gravity sensor, a cantilever displacement device is made of an elastic-sensitive element, and an electrical contact is driven by an energy-storage spring made of the elastic-sensitive element, so as to achieve the conversion of gravity changes into electrical signal changes.

As one of the motion sensors, an accelerometer sensor can be employed. The accelerometer sensor may detect the magnitude of an accelerated speed in each direction (generally, three-axis), the size and direction of a gravity may be detected while resting, and the accelerometer sensor may be configured to identify an application of a mobile phone gesture (e.g., horizontal and vertical screen switching, relevant games, and magnetometer gesture calibration), and vibration identification relevant functions (e.g., pedometer and knocking), etc.

In embodiments of the present disclosure, the above-mentioned motion sensors may be used as elements for obtaining "attitude parameter", but it is not limited thereto, and other sensors capable of obtaining the "attitude parameter" all fall within the protection scope of the present disclosure. For example, the other sensors may be a gyroscope or the like, and the operation principle and data processing process of the gyroscope may be similar to those of the prior art, and detailed description thereof will be omitted herein to avoid redundancy.

Further, in embodiments of the present disclosure, other sensors such as a barometer sensor, a hygrometer sensor, a thermometer sensor and an infrared sensor configurable for the mobile phone will not be elaborated herein.

The light sensor may include an ambient light sensor and a proximity sensor, the ambient light sensor may adjust the luminance of a display panel according to the brightness of ambient light, and the proximity sensor may close the display panel and/or backlight when the mobile phone reaches nearby the ear.

The audio circuit, the speaker 15, and a microphone may provide an audio interface between the user and the mobile phone. The audio circuit may transmit an electric signal converted from the received audio data to the speaker 15, and the speaker 15 converts the electric signal into a sound signal for output. Besides, the microphone converts a collected sound signal into an electric signal, the audio circuit converts the received electric signal into audio data and then outputs the audio data to a processor for processing, the audio data is transmitted to another mobile phone via the radio frequency circuit, or the audio data is output to the memory for further processing.

WiFi belongs to a short-range wireless transmission technology, the mobile phone may assist the user in E-mail receiving and sending, webpage browsing, access to streaming media and the like by means of the WiFi module, and it provides a wireless wideband internet access for the user. It may be understood that the WiFi module does not belong to necessary components of the mobile phone and can totally be omitted without changing the essence of the present disclosure as required.

The processor is a control center of the mobile phone, and is configured to connect all parts of the whole mobile phone by utilizing various interfaces and lines, to run or execute the software program and/or the module stored in the memory, and to call data stored in the memory to execute various functions and processing data of the mobile phone, so as to wholly monitor the mobile phone. Alternatively, the processor may include one or more processing units. Preferably, the processor may be integrated with an application processor and a modulation-demodulation processor, the application processor mainly processes an operation system, a user interface, an application program and the like, and the modulation-demodulation processor mainly processes wireless communication.

It may be understood that the modulation-demodulation processor may not be integrated into the processor.

The processor may also act as an implementation element of the processing unit described above and perform the same or similar functions as the processing unit.

The mobile phone may further include a power supply (such as a battery) for supplying power to each component.

Preferably, the power supply may be connected to the processor logically via a power supply management system, so as to implement functions of charging, discharging and power consumption management and the like by means of the power supply management system. The mobile phone may further include a Bluetooth module and the like, which are not shown, though, will not be elaborated herein.

What needs to be illustrated is that the mobile phone is just an example to illustrate the terminal 1000, and the present disclosure is not limited to this. The present disclosure can be applied to a mobile phone, a tablet computer, and so on, and the present disclosure is not limited to this.

In the description of this specification, the description of the terms "one embodiment", "some embodiments", "exemplary embodiment", "example", "specific example", or "some examples", etc., means to refer to the specific feature, structure, material or characteristic described in connection with the embodiments or examples being included in at least one embodiment or example of the present disclosure. In the present specification, the term of the above schematic representation is not necessary for the same embodiment or example. Furthermore, the specific feature, structure, material, or characteristic described may be in combination in a suitable manner in any one or more of the embodiments or examples.

Although embodiments of the present disclosure have been illustrated and described, it shall be understood by those skilled in the art that changes, modifications, alternatives and variants can be made in the embodiments without departing from the scope of the present disclosure, and the scope of the present disclosure is defined by claims and their equivalents.

What is claimed is:

1. A housing assembly for a terminal, comprising:
   a middle frame;
   an electroacoustic assembly, arranged on the middle frame and defining a sound transmission hole; and
   a decorative member, defining an inner space;
   wherein at least portion of the decorative member faces the sound transmission hole, the decorative member is fixed to the electroacoustic assembly, at least a portion of the decorative member is arranged between the electroacoustic assembly and the middle frame and is directly fixed to the electroacoustic assembly, and the sound transmission hole directly communicates with the inner space of the decorative member.

2. The housing assembly as described in claim 1, wherein the decorative member is directly fixed to the electroacoustic assembly via dispensed adhesive, a snap structure, a screw structure, a welded part, or integral forming.

3. The housing assembly as described in claim 1, wherein the middle frame defines a mounting hole, and at least part of the electroacoustic assembly is arranged in the mounting hole.

4. The housing assembly as described in claim 3, wherein at least part of the decorative member is received in the mounting hole.

5. The housing assembly as described in claim 1, wherein the electroacoustic assembly is a receiver assembly, and the receiver assembly comprises:
   a bracket;
   a closure plate, arranged on the bracket, wherein the sound transmission hole is defined in the closure plate, the portion of the decorative member is located on a side of the closure plate that is away from the bracket, and the decorative member is directly fixed to at least one of the bracket and the closure plate via dispensed adhesive, a snap structure, a screw structure, a welded part, or integral forming; and
   a vibrating diaphragm, arranged on the closure plate to cover the sound transmission hole.

6. The housing assembly as described in claim 5, wherein the closure plate comprises magnetic conductive material.

7. The housing assembly as described in claim 1, wherein the electroacoustic assembly is a speaker assembly, the speaker assembly comprises:
   a speaker; and
   a sound transmission part, arranged on the speaker, the sound transmission hole is defined in the sound transmission part, and the decorative member is fixed to the sound transmission part via dispensed adhesive, a snap structure, a screw structure, a welded part, or integral forming.

8. The housing assembly as described in claim 1, wherein the electroacoustic assembly is a microphone assembly, wherein the microphone assembly comprises:
   a microphone; and
   a shielding case, arranged on the microphone, the sound transmission hole is defined in the shielding case, and the decorative member is directly fixed to the shielding case via dispensed adhesive, a snap structure, a screw structure, a welded part, or integral forming.

9. The housing assembly as described in claim 1, wherein the decorative member comprises:
- a metal mesh; and
- a flange, positioned on an edge of the metal mesh and directly fixed to the electroacoustic assembly via dispensed adhesive, a snap structure, a screw structure, a welded part, or integral forming.

10. The housing assembly as described in claim 1, wherein the decorative member has a connection surface configured to couple with the electroacoustic assembly, the electroacoustic assembly has a connection surface configured to couple with the decorative member, and at least one of the connection surface of the decorative member and the connection surface of the electroacoustic assembly is a curved surface.

11. The housing assembly as described in claim 1, wherein the decorative member comprises magnetic conductive material.

12. The housing assembly as described in claim 1, wherein the housing assembly further comprises a cover plate, the cover plate is arranged at a side of the decorative member away from the electroacoustic assembly, and the cover plate defines a sound transmission opening receiving the at least portion of the decorative member.

13. The housing assembly as described in claim 12, wherein the cover plate is fixed to the decorative member via a double-sided adhesive tape.

14. The housing assembly as described in claim 12, wherein the cover plate is fixed to the decorative member via dispensed adhesive.

15. The housing assembly as described in claim 1, wherein one of the electroacoustic assembly and the decorative member comprises a snap protrusion, and the other of the electroacoustic assembly and the decorative member defines a snap groove for mating with the snap protrusion.

16. The housing assembly as described in claim 15, wherein a seal ring is arranged between the snap protrusion and the snap groove.

17. The housing assembly as described in claim 1, wherein at least part of the electroacoustic assembly is a metal part, the decorative member is metal, and the metal decorative member is fixed to the electroacoustic assembly via a welded part.

18. A housing assembly for a terminal, comprising:
- a frame;
- an electroacoustic assembly, arranged on the frame and defining a sound transmission hole; and
- a decorative member, covering the sound transmission hole and defining an inner space;
- wherein at least a portion of the decorative member is arranged between the electroacoustic assembly and the frame and is directly fixed to the electroacoustic assembly, and the sound transmission hole directly communicates with the inner space of the decorative member.

19. The housing assembly as described in claim 18, wherein the decorative member is directly fixed to the electroacoustic assembly via dispensed adhesive, a snap structure, a screw structure, a welded part, or integral forming.

20. A terminal, comprising:
- a front cover, defining a sound transmission opening;
- a back cover;
- a middle frame, defining a mounting hole and located between the front cover and the back cover;
- an electroacoustic assembly, defining a sound transmission hole, at least part of the electroacoustic assembly being arranged in the mounting hole; and
- a decorative member, defining an inner space;
- wherein at least portion of the decorative member faces the sound transmission hole, the at least portion of the decorative member is received in the sound transmission opening, and another portion of the decorative member is arranged between the middle frame and the electroacoustic assembly and is directly fixed to the electroacoustic assembly, the sound transmission hole directly communicates with the inner space of the decorative member.

* * * * *